UNITED STATES PATENT OFFICE.

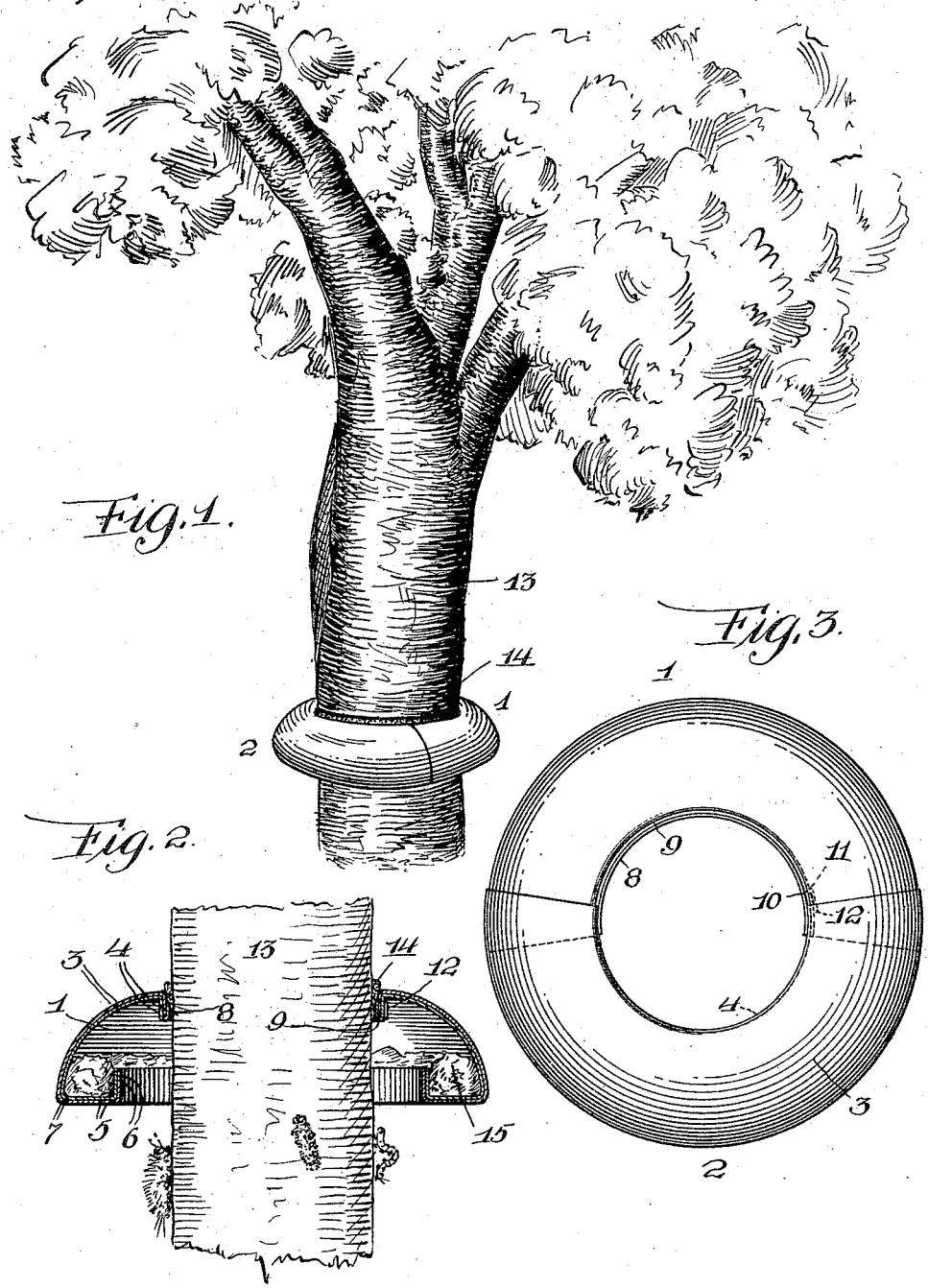

ALPHONSE M. BARRY AND ROBERT D. BARRY, OF PITTSBURG, PENNSYLVANIA.

VERMIN AND BUG SHIELD FOR TREES.

983,114. Specification of Letters Patent. Patented Jan. 31, 1911.

Application filed October 12, 1910. Serial No. 586,728.

*To all whom it may concern:*

Be it known that we, ALPHONSE M. BARRY and ROBERT D. BARRY, citizens of the United States of America, residing at Pittsburg, in the county of Allegheny and State of Pennsylvania, have invented certain new and useful Improvements in Vermin and Bug Shields for Trees, of which the following is a specification, reference being had therein to the accompanying drawing.

This invention relates to vermin and bug shields for trees, large shrubbery, and vines, and such structures as are often infested by various species of leave-eating, bark-boring, and sap-sucking insects, that are injurious to the growth and development of the tree.

The primary object of the invention is to provide an adjustable shield that can be easily mounted upon a tree without injuring the same to prevent insects from ascending the tree beyond the height of the shield.

Another object of the invention is to provide a shield for supporting cotton or other matter in position to retard the progress of insects ascending the tree, the cotton or other matter being protected from the forces of nature, dirt, and matter that would otherwise render the cotton useless and impair its appearance upon the tree.

A still further object of the invention is to provide a shield of the above type that will be simple in construction, durable, easy to install, and efficient for the purposes for which it is intended.

We attain the above objects by a mechanical construction that will be hereinafter specifically described and then claimed, and reference will now be had to the drawing forming a part of this specification, wherein there is illustrated a preferred embodiment of the invention, but it is to be understood that the structural elements thereof are susceptible to such changes as fall within the scope of the appended claims.

In the drawings: Figure 1 is a perspective view of the shield as mounted upon a tree. Fig. 2 is a cross sectional view of the same, and Fig. 3 is a plan of the shield.

The shield comprises two semi-circular adjustable and telescopic sections generally designated by the reference numerals 1 and 2, these sections being made of light and durable sheet metal pressed and stamped to the desired shape. The sections are practically identical in construction, with the exception that one section is of a larger size than the other section, whereby the section 2 will telescope the section 1. Each section comprises a rounded or curved wall 3 having the upper edge thereof bent to provide a depending flange 4. The lower edge of the wall 3 terminates in a lateral inwardly projecting flange 5 and this flange is bent upwardly, as at 6, to coöperate with the wall 3 in forming a groove or pocket 7.

The flange 4 of the section 1 is bent upwardly, as at 8, to provide a groove 9 and the flange 4 of the section 2 is adapted to slide in said groove. The flange 4 of the section 2 at one end thereof has a malleable lug 10 extending through a slot or opening 11 provided therefor in the flange 4 of the section 1, said lug being bent rearwardly upon the flange 4, as at 12, thereby locking the ends of the sections 1 and 2 together and allowing the opposite ends of said sections to be adjusted to fit a tree 13. The tree 13 is encircled by a piece of felt or other material 14 prior to placing the shield in engagement therewith, whereby the bark of the tree will not be injured by the shield or insects allowed to crawl between the tree and the upper edges of the shield due to any irregularities in the bark of the tree.

The pockets 7 of the sections 1 and 2 are adapted to be filled with cotton 15 or other substances, and it is in connection with this cotton that a suitable poisonous ingredient can be used for killing or exterminating such insects that contact with the cotton.

The shield in its entirety can be made of a noncorrosive metal and painted or otherwise finished to present a neat appearance.

What we claim, is:

1. A tree shield comprising two adjustable telescopic sections having the lower edges thereof shaped to provide pockets and the upper edges thereof shaped to interlock.

2. A tree shield comprising two semi-circular sections having rounded or curved outer walls with the upper edges of said walls bent to interlock and the lower edges thereof bent to provide pockets, each section having an end thereof connected to the end of the other section, and the other ends of said sections telescoping, substantially as described.

In testimony whereof we affix our signatures in the presence of two witnesses.

ALPHONSE M. BARRY.
ROBERT D. BARRY.

Witnesses:
   PAUL A. BECK,
   KARL H. BUTLER.